United States Patent [19]
Saito et al.

[11] Patent Number: 4,477,630
[45] Date of Patent: Oct. 16, 1984

[54] AROMATIC POLYSULFONE RESIN COMPOSITION SUITABLE FOR USE IN SELF-LUBRICATING MOLDING COMPOSITIONS

[75] Inventors: Teruo Saito, Kusatsu; Kuniaki Asai, Tondabayashi; Isamu Nakagawa, Osaka; Tadayasu Kobayashi, Takatsuki, all of Japan

[73] Assignee: Sumitomo Chemical Company, Limited, Osaka, Japan

[21] Appl. No.: 473,459

[22] Filed: Mar. 9, 1983

[30] Foreign Application Priority Data

Mar. 16, 1982 [JP] Japan ................................. 57-42282

[51] Int. Cl.$^3$ ...................... C08L 27/12; C08L 27/18; C08L 67/00; C08L 81/06
[52] U.S. Cl. ................................. 525/133; 524/406; 524/495; 525/144; 525/150; 525/151; 525/189; 525/190
[58] Field of Search ............... 525/133, 144, 189, 150, 525/151, 190; 524/406, 495

[56] References Cited

U.S. PATENT DOCUMENTS

| | | | |
|---|---|---|---|
| Re. 31,448 | 11/1983 | Attwood et al. | 525/150 |
| 3,287,288 | 11/1966 | Reiling | 525/144 |
| 3,356,760 | 12/1967 | Matray | 525/133 |
| 3,644,593 | 2/1972 | Nowak et al. | 525/151 |
| 3,981,945 | 9/1976 | Attwood et al. | 525/144 |
| 4,090,993 | 5/1978 | Attwood et al. | 525/150 |
| 4,131,711 | 12/1978 | Attwood | 525/150 |
| 4,169,117 | 9/1979 | Vasta | 525/150 |

FOREIGN PATENT DOCUMENTS

| | | | |
|---|---|---|---|
| 55-45704 | 3/1980 | Japan | 525/189 |
| 996764 | 6/1965 | United Kingdom | 525/144 |

Primary Examiner—Allan Lieberman
Attorney, Agent, or Firm—Stevens, Davis, Miller & Mosher

[57] ABSTRACT

A resin composition excellent in sliding characteristics, composed of 95 to 30% by weight of an aromatic polysulfone, 2.5 to 60% by weight of a fluorocarbon polymer and 2.5 to 60% by weight of an oxybenzoyl polyester.

8 Claims, No Drawings

AROMATIC POLYSULFONE RESIN COMPOSITION SUITABLE FOR USE IN SELF-LUBRICATING MOLDING COMPOSITIONS

This invention relates to a resin composition wherein an aromatic polysulfone is mixed with a fluorocarbon polymer and an oxybenzoyl polyester to provide molded products excellent in sliding characteristics. More particularly, this invention relates to a resin composition which provides oil-less bearings excellent in wear resistance and lubricity.

Being excellent in heat resistance, mechanical properties, electrical properties, hot water resistance, etc., aromatic polysulfones are being widely used in various applications of electrical and electronic field, mechanical field, automobile field, aeroplane field and medical treatment and food industry fields. Compositions comprising an aromatic polysulfone and a fluorocarbon polymer preferably a polytetrafluoroethylene are endowed, in addition to the abovementioned characteristics, with self-lubricity and therefore are being used in various applications of the above fields associated with sliding.

However, compositions composed of an aromatic polysulfone and a fluorocarbon polymer, when used in oil-less bearings and the like, are not sufficient in sliding characteristics. Generally, in order for a plastic to be satisfactorily used as a material for sliding surfaces of bearings and the like, the plastic must have a low and stable friction coefficient, a high limit PV value and a low wear factor, namely, an excellent wear resistance.

"PV value" is a product of a pressure P applied to a bearing and a sliding speed V of the bearing. "Limit PV value" is a PV value at a limit point beyond which the bearing temperature rises markedly due to generation of frictional heat at end faces of bearings and the like and thereby the material plastic causes softening, melting and chemical decomposition and as a result a normal frictional movement can not be continued. Even under a condition within the limit PV value, however, wear does progress little by little and accordingly bearing life must be considered. For this reason, in bearing designing, wear factor is more important than limit PV value, and the latter is used only as a criterion of life of bearings and the like.

Wear factor K is generally represented by the following equation:

$$K = W/PVT$$

wherein W is an amount of wear in mm, P is a pressure in kg/cm$^2$, V is a speed in m/min and T is a time in hr.

This K value, as in the case of limit PV value, differs depending upon values of P and V, even if PV value stays same. That is, for one PV value, K value differs depending upon conditions of (a) a high pressure and a low speed and (b) a low pressure and a high speed.

Nevertheless, K value is generally in inverse proportion to pressure and running distance (product of speed and time) and K has a unit of (mm/km)/(kg/cm$^2$). In the case of a plastic bearing, it is believed that, if the bearing has a K value of less than $1 \times 10^{-4}$, the bearing can be safely used in an oil-less state even if a life factor is taken into consideration.

A bearing produced from a composition composed of an aromatic polysulfone and a fluorocarbon polymer, when used in an oil-less state within its limit PV value (about 400 kg/cm$^2$·m/min), gives a K value of $5 \times 10^{-4}$ to $5 \times 10^{-3}$ which is larger than a required value by one figure or more, and accordingly has a very short life. Addition of a fibrous reinforcing material such as glass fiber, carbon fiber or the like to said composition decreases K value slightly, however, causes a problem of damaging a counter metal material. When the counter metal material is a soft metal such as aluminum, stainless steel or the like, this phenomenon is particularly conspicuous. In this case, once the worn powder of the metal is generated, it acts as rough surface to the bearing plastic whereby the friction coefficient of the bearing becomes unstable and the wear of the plastic is also promoted. Further addition of a solid lubricant such as graphite or the like to said composition also improves lubricity and moreover imparts thermal conductivity and thereby K value is improved slightly. However, the improvement is still not sufficient.

The present inventors made strenous efforts to overcome the above problems, and as a result, found that further addition of an oxybenzoyl polyester to a composition of an aromatic polysulfone and a fluorocarbon polymer reduces the value of wear factor K to less than $1 \times 10^{-4}$ (mm/km)/(kg/cm$^2$) and, when this new composition is used as oil-less bearing, it can be used safely even if a life factor is considered and moreover does not damage a counter material. Based on this finding, this invention has been accomplished.

That is, a composition composed of 95 to 30% by weight of an aromatic polysulfone, 2.5 to 60% by weight of a fluorocarbon polymer and 2.5 to 60% by weight of an oxybenzoyl polyester was found to solve the above problems, and it led to the completion of the present invention.

An object of this invention is to provide a resin composition which can be molded into products of excellent sliding characteristics.

Other objects and advantages of this invention will be made clear by the descriptions which follow.

The aromatic polysulfone usable in this invention comprises a repeating unit represented by the following structure:

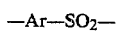

wherein Ar is a bivalent aromatic radical which may vary from unit to unit in the polymer chain (so as to form copolymers of various kinds). In general, thermoplastic aromatic polysulfones have at least a repeating unit represented by the following structure:

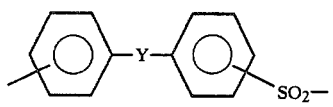

wherein Y is an oxygen atom or a sulfur atom or a residue of an aromatic diol, for example, 4,4'-bisphenol. Of these polymers, commercial products generally have a repeating unit representing by the following structure (products of ICI Ltd.).

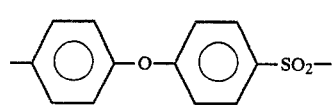

(I)

Other commercial products are said to have a repeating unit represented by the following structure (products of Union Carbide Corp.)

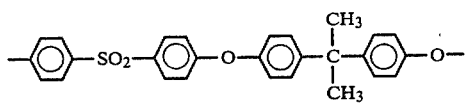

or a unit in which the following two structures are copolymerized in a certain ratio (products of Minesota Mining and Manufacturing Co.).

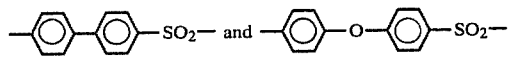

Other groups of these polymers have a repeating unit represented by the following structure

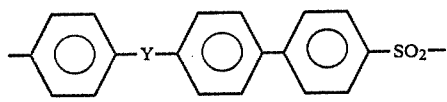

wherein Y is an oxygen atom or a sulfur atom and this repeating unit may be copolymerized with one of other repeating units mentioned above.

The fluorocarbon polymer usable in this invention comprises a polytetrafluoroethylene, a polytetrafluoroethylene-hexafluoropropylene copolymer, a polytrichlorofluoroethylene, a tetrafluoroethyleneperfluoroalkylvinyl ether copolymer, etc. Of these, a polytetrafluoroethylene (hereinunder, to be abbreviated to PTFE) is particularly preferable. Of PTFEs, a PTFE powder of lubricant grade having an average particle diameter of less than 20 $\mu$ is preferable. Examples of this PTFE powder commercially available include FLUON® L 169, L 170 and L 171 (products of ICI Ltd.), LUBLON® L-2, L-5 and LD-1 (products of Daikin Kogyo) and Teflon® TLP-10 and TLP-10F-1 (products of Du Pont Co.).

The oxybenzoyl polyester usable in this invention has usually a repeating unit represented by the following formula (IV)

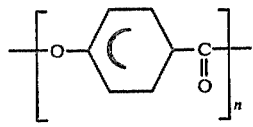

wherein n is an integer from 3 to 600 and preferably 30 to 200, and hardly softens at a temperature below 400° C. and very superior in wear resistance, compressive creep resistance and chemicals resistance. In addition, since its crystal is a plate crystal similarly to solid lubricants such as graphite and molybdenum disulfide, the oxybenzoyl polyester is excellent in self-lubricity and is being used mainly as wear improver for PTFE. For instance, by adding 20% by weight of an oxybenzoyl polyester to a PTFE, the wear amount of the composition is reduced to about 1/1000 or less of that of the PTFE and its friction coefficient not only maintains a low level of the PTFE but also is stable and further the composition does not damage a counter material, thus the composition provides an excellent sliding material.

As synthesis processes of the oxybenzoyl polyester, there are a process employed in Japanese Patent Publication Nos. 6796/1971 and 47870/1972 which use a high boiling solvent as polymerization medium, and a bulk polymerization process described in Japanese Patent Application "Kokai" (Laid-open) Nos. 46287/1979 and 46291/1979 which do not substantially use a solvent in the polymerization system. The oxybenzoyl polyester is commercially available under the brand name of EKONOL® E-101 (product of Sumitomo Chemical Company Ltd.).

The effective component ratio of the composition of this invention is 95 to 30% by weight of an aromatic polysulfone, 2.5 to 60% by weight of a fluorocarbon polymer and 2.5 to 60% by weight of an oxybenzoyl polyester, wherein the total amount of the fluorocarbon polymer and the oxybenzoyl polyester is 5 to 70% by weight of the composition.

When the total amount of the fluorocarbon polymer and the oxybenzoyl polyester exceeds 70% by weight of the resin composition and the amount of the aromatic polysulfone is less than 30% by weight, the resin composition loses fluidity and, even if molded products can be produced from the composition by injection molding, they have very low mechanical strengths and are easy to break.

When the total amount of the fluorocarbon polymer and the oxybenzoyl polyester is less than 5% by weight, the composition has no sufficient sliding characteristics.

When the total amount of the fluorocarbon polymer and the oxybenzoyl polyester is in the range of from 5 to 70% by weight, if the amount of the fluorocarbon polymer is less than 2.5% by weight, the composition has insufficient lubricity. When the total amount of the above two components is likewise in the above range, if the amount of the fluorocarbon polymer exceeds 60% by weight, dispersancy and compatibility of each component is reduced and accordingly a uniform composition is difficult to obtain. Meanwhile, the amount of the oxybenzoyl polyester requires at least 2.5% by weight from the standpoint of wear resistance and the wear resistance of the composition increases with the increase of the amount of the oxybenzoyl polyester, however, when the amount exceeds 60% by weight, the composition reduces fluidity substantially and molded products obtained therefrom decrease strengths markedly.

The resin composition of this invention may be further mixed with a solid lubricant such as graphite, molybdenum disulfide or the like to improve the lubricity of the composition.

A general mixing method for obtaining a resin composition of this invention is such that an aromatic polysulfone, a fluorocarbon polymer and an oxybenzoyl polyester are dry-blended in a mixer such as, for example, Henschel mixer, super mixer or the like, the blend is melt-kneaded in an one-screw or multi-screw extruder and strands are extruded therefrom, and these strands are pelletized by the use of a cutter. The mixing method is not particularly limited to the above one. Production of molded articles such as bearing and the like from the present composition is generally conducted by the use of an injection molding machine.

The resin composition according to this invention has excellent sliding characteristics. Since its wear factor which serves as one useful datum in bearing designing is a value ($1 \times 10^{-5}$ to $10 \times 10^{-5}$ (mm/km)/(kg/cm$^2$)) lower by one figure or more than those of compositions comprising an aromatic polysulfone and a fluorocarbon polymer, the present composition is a molding material very suitable for oil-less bearings.

This invention will be illustrated below referring to the following Examples, however, these merely exemplify preferable embodiments and do not restrict the scope of this invention.

stable, and the wear of SUS-304 as counter material was almost negligible.

TABLE 1

| | Component ratio, % by weight | | | Tensile characteristics | | | | Sliding characteristics | |
|---|---|---|---|---|---|---|---|---|---|
| Example | Aromatic polysulfone | Fluorocarbon polymer | Oxybenzoyl polymer | Strength, Kg/cm$^2$ | Elongation, % | Modulus of elasticity, Kg/cm$^2$ | Friction coefficient, $\mu$ | Wear factor, $K \left( \frac{mm}{Km} / \frac{kg}{cm^2} \right)$ | Wear amount of counter material, mg |
| 1 | 80 | 10 | 10 | 643 | 8.0 | $2.2 \times 10^4$ | 0.24 | $8.9 \times 10^{-5}$ | 0.01 or less |
| 2 | 70 | 10 | 20 | 558 | 6.2 | $2.4 \times 10^4$ | 0.23 | $7.1 \times 10^{-5}$ | 0.01 or less |
| 3 | 60 | 20 | 20 | 467 | 5.6 | $2.2 \times 10^4$ | 0.22 | $6.3 \times 10^{-5}$ | 0.01 or less |
| 4 | 50 | 20 | 30 | 398 | 3.6 | $2.3 \times 10^4$ | 0.22 | $4.5 \times 10^{-5}$ | 0.01 or less |
| 5 | 40 | 20 | 40 | 372 | 2.1 | $2.6 \times 10^4$ | 0.23 | $2.6 \times 10^{-5}$ | 0.01 or less |
| 6 | 40 | 40 | 20 | 360 | 3.2 | $2.2 \times 10^4$ | 0.20 | $5.8 \times 10^{-5}$ | 0.01 or less |

EXAMPLES 1 TO 6

In a Henschel mixer, there were mixed (a) a polyether sulfone having a basic structural unit of

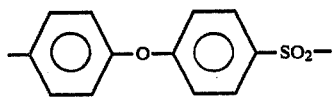

as the aromatic polysulfone (PES 200 P, manufactured by ICI), (b) a PTFE (FLUON ® L 169, manufactured by ICI) and (c) an oxybenzoyl polyester having an average particle diameter of about 20 $\mu$ (EKONOL ® E 101, manufactured by Sumitomo Chemical Company Ltd.) so as to give a component ratio shown in Table 1. The resulting mixture was subjected to extrusion pelletizing by the use of a twin screw extruder (PCM-30, manufactured by Ikegai Tekko) of which cylinder center temperature was fixed at 310° to 330° C., to obtain pellets. By the use of a 1 oz. injection molding machine (NEOMAT 47/28, manufactured by Sumitomo Jukikai) of which cylinder center temperature was fixed at 340° to 370° C., the pellets were molded into JIS No. 1 dumbbells and wear rings (outside diameter: 25.6 mm, inside diameter: 20 mm, height: 15 mm). The JIS No. 1 dumbbells were used for measurement of tensile characteristics. By using a Suzuki type wear tester which employed conditions of a pressure of 6 kg/cm$^2$, a speed of 40 m/min and a stainless steel (SUS-304) as a counter material, the wear rings were subjected first to 2 hours of running-in and then to 20 hours of sliding to measure the firction coefficient and wear factor of the rings as well as the wear amount of the counter material. These results are shown in Table 1.

As is obvious from the table, with the increase of the addition amount of the oxybenzoyl polyester, tensile strength and elongation decreased slightly but wear factor K representing an wear resistance decreased markedly. In all compositions, K was less than $1 \times 10^{-4}$ (mm/km) / (kg/cm$^2$), friction coefficient was low and stable, and the wear of SUS-304 as counter material was almost negligible.

Compositions of Examples 3 and 5 were subjected to injection molding to form bearings each of an outside diameter of 15 mm, an inside diameter of 6 mm and a length of 10 mm. By using a small size bearing tester which employed conditions of a pressure of 6 kg/cm$^2$, a speed of 40 m/min and stainless steel (SUS-304) as a counter material, these bearings were subjected to slidings of initial 2, 50, 100 and 300 hours. From the wear amounts, the wear factor were calculated. These results are shown in Table 2.

TABLE 2

| | Wear factor, $\frac{mm}{km} / \frac{kg}{cm^2}$ | | | |
|---|---|---|---|---|
| | Initial 2 hr. | 50 hr. | 100 hr. | 300 hr. |
| Example 3 | $18.2 \times 10^{-5}$ | $4.9 \times 10^{-5}$ | $3.2 \times 10^{-5}$ | $1.8 \times 10^{-5}$ |
| Example 5 | $10.4 \times 10^{-5}$ | $2.9 \times 10^{-5}$ | $2.4 \times 10^{-5}$ | $1.0 \times 10^{-5}$ |

As is obvious from the table, in both compositions, although the wear factor of initial 2 hours was slightly large, the wear factor decreased with the lapse of time and no unusualness was found at all even after 300 hours.

EXAMPLES 7 AND 8

In the same component ratios as in Examples 3 and 5 and also by using, as the aromatic polysulfone, a polysulfone having a basic structure of

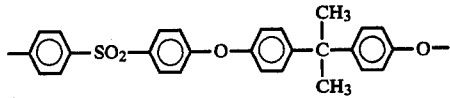

(UDEL* ® 1700, manufactured by UCC), JIS No. 1 dumbbells and wear rings were molded in the same manner as in Examples 1 to 6 except that the cylinder center temperature was fixed at 290° to 310° C. in extrusion pellitizing and at 320° to 350° C. in injection molding. With these dumbbells and wear rings, tensile characteristics and sliding characteristics were measured in the same manner as in Examples 1 to 6. These results are shown in Table 3.

As is obvious from the table, in both compositions, K value was less than $1 \times 10^{-4}$ (mm/km)/(kg/cm$^2$), friction coefficient was low and stable, and the wear of SUS-304 as counter material was almost negligible.

TABLE 3

| Example | Component ratio, % by weight | | | Tensile characteristics | | | Sliding characteristics | | |
|---|---|---|---|---|---|---|---|---|---|
| | Aromatic polysulfone | Fluorocarbon polymer | Oxybenzoyl polymer | Strength, $Kg/cm^2$ | Elongation, % | Modulus of elasticity, $Kg/cm^2$ | Friction coefficient, $\mu$ | Wear factor, $K\left(\frac{mm}{Km}/\frac{kg}{cm^2}\right)$ | Wear amount of counter material, mg |
| 7 | 60 | 20 | 20 | 448 | 5.4 | $2.3 \times 10^4$ | 0.23 | $5.9 \times 10^{-5}$ | 0.01 or less |
| 8 | 40 | 20 | 40 | 368 | 2.6 | $2.5 \times 10^4$ | 0.24 | $3.8 \times 10^{-5}$ | 0.01 or less |

Similarly to Examples 3 and 5, there were molded bearings each of an outside diameter of 15 mm, an inside diameter of 6 mm and a length of 10 mm. With these bearings and by employing a small size bearing tester, wear factor was measured up to 300 hours in the same manner as in Examples 3 and 5. These results are shown in Table 4.

TABLE 4

| | Wear factor, $\frac{mm}{km}/\frac{kg}{cm^2}$ | | | |
|---|---|---|---|---|
| | Initial 2 hr. | 50 hr. | 100 hr. | 300 hr. |
| Example 7 | $23.2 \times 10^{-5}$ | $6.8 \times 10^{-5}$ | $4.8 \times 10^{-5}$ | $4.1 \times 10^{-5}$ |
| Example 8 | $13.8 \times 10^{-5}$ | $4.2 \times 10^{-5}$ | $2.8 \times 10^{-5}$ | $1.6 \times 10^{-5}$ |

As is obvious from the table, both compositions showed results similar to those of Examples 3 and 5.

COMPARATIVE EXAMPLES 1 TO 4

Using the same aromatic polysulfone, fluorocarbon polymer and oxybenzoyl polyester as in Examples 1 to 6, there were prepared compositions having ineffective component ratios. Similar investigations to those in Examples 1 to 6 were conducted for these compositions. Results are shown in Table 5.

TABLE 5

| Comparative Example | Component ratio, % by weight | | | Tensile characteristics | | | Sliding characteristics | | |
|---|---|---|---|---|---|---|---|---|---|
| | Aromatic polysulfone | Fluorocarbon polymer | Oxybenzoyl polyester | Strength, $Kg/cm^2$ | Elongation, % | Modulus of elasticity, $Kg/cm^2$ | Friction coefficient, $\mu$ | Wear factor $K\left(\frac{mm}{Km}/\frac{kg}{cm^2}\right)$ | Wear amount of counter material, mg |
| 1 | 80 | 20 | 0 | 700 | 11.8 | $1.3 \times 10^4$ | 0.26 | $92.5 \times 10^{-5}$ | 0.05 |
| 2 | 80 | 18 | 2 | 675 | 10.6 | $1.5 \times 10^4$ | 0.25 | $30.9 \times 10^{-5}$ | 0.03 |
| 3 | 80 | 2 | 18 | 673 | 7.4 | $2.3 \times 10^4$ | 0.33 | $10.8 \times 10^{-5}$ | 0.01 or less |
| 4 | 25 | 35 | 40 | | | | Difficult to mold | | |

The composition containing no oxybenzoyl polyester (Comparative Example 1) and the one containing less than 2.5% by weight of the oxybenzoyl polyester (Comparative Example 2) were both insufficient in wear resistance. The composition containing less than 2.5% by weight of the fluorocarbon polymer (Comparative Example 3) showed high values in friction coefficient and wear factor. The composition in which the total amount of the fluorocarbon polymer and the oxybenzoyl polyester exceeded 70% by weight (Comparative Example 4) had an insufficient flow property and accordingly its injection molding was difficult.

What is claimed is:

1. A resin composition which is excellent in sliding characteristics, consisting essentially of
   (1) 30-95% by weight of a thermoplastic aromatic polysulfone having a repeating unit represented by the following structure

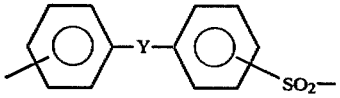

wherein Y is an oxygen atom, a sulfur atom or a residue of an aromatic diol;
   (2) 2.5-60% by weight of a fluorocarbon polymer selected from the group consisting of a polytetrafluoroethylene, a polytetrafluoroethylene-hexafluoropropylene copolymer, a polytrichlorofluoroethylene and a tetrafluoroethyleneperfluoroalkylvinyl ether copolymer; and
   (3) 2.5-60% by weight of an oxybenzoyl polyester having a repeating unit represented by the following structure

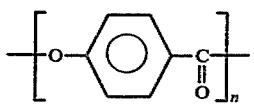

wherein n is an integer from 3 to 600 and wherein the total amount of the fluorocarbon polymer (2) and the oxybenzoyl polyester (3) is in the range of from 5 to 70% by weight.

2. A resin composition according to claim 1, wherein the repeating unit of the thermoplastic aromatic polysulfone is

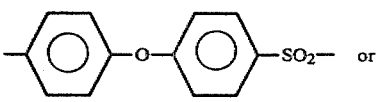

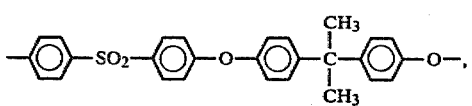

or consists of  and

-continued

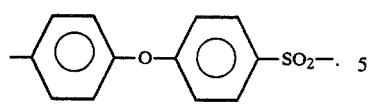

3. A resin composition according to claim 1, wherein the fluorocarbon polymer is a polytetrafluoroethylene.

4. A resin composition according to claim 3, wherein the fluorocarbon polymer is a polytetrafluoroethylene powder of lubricant grade having an average particle diameter of less than 20 μ.

5. A resin composition according to claim 1 containing also a solid lubricant.

6. A resin composition according to claim 2, containing also a solid lubricant.

7. A resin composition according to claim 3, containing also a solid lubricant.

8. A resin composition according to claim 4, containing also a solid lubricant.

* * * * *